United States Patent

Jokinen et al.

[11] Patent Number: 5,942,199
[45] Date of Patent: Aug. 24, 1999

[54] METHOD FOR THE TREATMENT OF IMPURE ALUMINIUM OXIDE

[75] Inventors: Simo Jokinen, Oulu; Maire Iida Annikki Mattila, Espoo, both of Finland; Anna-Mari Kristiina Stein, München, Germany; Sirpa-Liisa Katariina Mattila, Helsinki, Finland; Gerard Verkoijen, Hellevoetsluis, Netherlands

[73] Assignee: Kemira Chemicals Oy, Helsinki, Finland

[21] Appl. No.: 08/833,718

[22] Filed: Apr. 9, 1997

[30] Foreign Application Priority Data

Apr. 12, 1996 [FI] Finland .................................. 961619

[51] Int. Cl.⁶ ........................................ C01F 1/00
[52] U.S. Cl. .................. 423/122; 423/130; 423/525; 423/556; 502/27
[58] Field of Search ............................. 423/130, 556, 423/122, 525, 128; 502/27

[56] References Cited

U.S. PATENT DOCUMENTS

| | | |
|---|---|---|
| 1,457,030 | 5/1923 | Hechenbleikner et al. ............ 423/525 |
| 2,463,204 | 3/1949 | Reich ...................................... 423/526 |
| 3,814,701 | 6/1974 | Browning ............................... 423/130 |
| 4,297,304 | 10/1981 | Scheffler et al. ...................... 264/0.5 |
| 4,919,819 | 4/1990 | Robinson et al. ..................... 423/556 |
| 5,114,699 | 5/1992 | Wiewiorowski et al. ............... 423/525 |
| 5,456,739 | 10/1995 | Donalisio ................................. 75/403 |

FOREIGN PATENT DOCUMENTS

| | | |
|---|---|---|
| 0018339 A1 | 10/1980 | European Pat. Off. |
| 1592155 | 10/1970 | Germany. |
| 2532079 | 2/1976 | Germany. |
| 4027159A1 | 3/1992 | Germany. |
| 53-29298 | 3/1978 | Japan ...................................... 423/556 |
| 2212486 | 7/1989 | United Kingdom. |
| WO 95/32152 | 11/1995 | WIPO. |
| WO 95/32153 | 11/1995 | WIPO. |

OTHER PUBLICATIONS

Fasullo, "Sulfuric Acid, Use and Handling", TP 215 F35 pp. 261–269, 1965 (No Month).

*Primary Examiner*—Ngoc-Yen Nguyen
*Attorney, Agent, or Firm*—Banner & Witcoff, Ltd.

[57] ABSTRACT

The invention relates to a method for the treatment of an impure aluminium oxide so that the organic impurities present therein it are converted into an insoluble and easily separable substance. According to the invention, aluminium oxide which contains organic matter as impurities is finely ground, the finely ground aluminium oxide is dissolved at an elevated temperature in sulphuric acid which has a concentration of minimum 90% by weight, the amount of the sulphuric acid being at least stoichiometric in relation to the amount of aluminium oxide, the organic matter being carbonized into an insoluble and easily separable substance, and, if desired, the obtained mixture is treated further in order to form a solution-form or solid chemical which contains aluminium.

16 Claims, 2 Drawing Sheets

METHOD FOR THE TREATMENT OF
IMPURE ALUMINIUM OXIDE

FIELD OF THE INVENTION

The invention relates to a method for the treatment of aluminium oxide which contains organic impurities.

BACKGROUND OF THE INVENTION

In the hydrogen peroxide process, aluminium oxide is used for regenerating and removing organic secondary products formed in the working solution. The porosity of active aluminium oxide allows it to be used particularly for the purpose of adsorbing organic compounds used in the anthraquinone process. The impurities are mostly aromatic hydrocarbons. Having lost its activity, aluminium oxide is removed from the process and replaced with fresh oxide. The spent aluminium oxide contains organic substances which restrict its utilization. At present, the waste aluminium oxide is usually disposed of as waste, or stored with a view of potential utilization.

There have been various attempts to purify impure aluminium oxide. The applicant's previous patent application PCT/FI95/00273 discloses a method based on heat treatment. According to the method, spent aluminium oxide from an anthraquinone working solution is heat treated at a temperature of 500–900° C. The heat-treated aluminium oxide is dissolved in a concentrated acid at an elevated temperature, is diluted with water, and is filtered or centrifuged, if necessary, to remove any undissolved matter. Aluminium salts purified by this method are suitable for use as water treatment and retention chemicals.

The applicant's previous application PCT/FI95/00272 discloses an extraction-based method for purifying aluminium oxide. According to the method, aluminium oxide is pulverized and is thereafter dissolved in an acid at an elevated temperature. Thereafter the solution is diluted with water, and an organic solvent is added to it to extract the organic impurities. The phases are separated, the aluminium-salt-containing aqueous phase which has settled at the bottom is filtered or centrifuged to remove any residual undissolved matter and is used as such or is purified further. Part of the organic phase is directed to combustion and part for reuse as a solvent in the extraction step. Aluminium salts purified by this method are suitable for use as water treatment and retention chemicals.

Both of the methods described above have their disadvantages. The disadvantage of the method based on heat treatment is that the impurities become distilled off as a tarry substance in the combustion and thereby substantially inconvenience the combustion. A second disadvantage is that in the combustion the solubility of aluminium oxide in acid is reduced. Furthermore, the combustion process is expensive and produces emissions hazardous to the environment. The main disadvantage of the method based on extraction is also the formation of tarry substances, which adhere to the extraction apparatus and thereby hamper the extraction. Furthermore, as a process the extraction method is relatively complicated, and therefore the method is expensive. In addition, the method based on extraction also requires a combustion plant.

SUMMARY OF THE INVENTION

It is an object of the present invention to provide a method for purifying impure aluminium oxide. A particular object is a method by which the above-mentioned organic impurity may be converted into an easily treatable and easily removable form, which in turn would enable the aluminium oxide to be exploited. These objects are achieved by the method according to the invention, which is in the main characterized in what is stated in the characterizing clause of claim 1.

Thus the invention relates to a method for the treatment of impure aluminium oxide, in which method aluminium oxide, which contains organic matter as impurities, is finely ground, the finely ground aluminium oxide is dissolved at an elevated temperature in sulphuric acid having a concentration of at minimum 90% by weight, the amount of sulphuric acid being at least stoichiometric in proportion to the amount of aluminium oxide, the organic matter being carbonized into an insoluble and easily separable substance and, if desired, the obtained mixture is treated further to produce a solution-form or solid chemical which contains aluminium.

Thus the invention makes it possible to prepare usable aluminium-containing chemicals from an aluminium oxide which contains organic impurities, by a simple method without requiring a combustion process and/or an extraction process.

It is characteristic of the invention that impure aluminium oxide is mixed with an excess of concentrated sulphuric acid at an elevated temperature. The concentration of the sulphuric acid is at minimum 90% by weight, preferably within the range 93–98% by weight. It is necessary to raise the temperature to at least 70° C. for starting the dissolving reaction of aluminium oxide. After the reaction has started, the heat released in the dissolving further raises the temperature of the mixture typically to a range of 120–200° C. This temperature is dependent, for example, on the degree of fineness of the aluminium oxide; the finer the dissolving aluminium oxide, the higher the reaction temperature will rise. During the dissolving, the organic matter which is present as an impurity is at the same time carbonized. In consequence to the carbonization, the organic impurity will turn into an insoluble and granular substance which can in a subsequent step of the method be removed, for example by filtration. It is characteristic of the invention that the tarry substance mentioned above cannot form. Simultaneously with the carbonization of the impurities, the aluminium oxide dissolves in sulphuric acid.

The central idea of the invention is to produce conditions in which the organic impurity becomes carbonized. According to the invention, such conditions are achieved when the aluminium oxide which contains impurities is dissolved in a concentrated sulphuric acid at an elevated temperature. As was stated above, the concentration of the sulphuric acid is at minimum 90% by weight, preferably within the range 93–98% by weight. The amount of sulphuric acid is at least stoichiometric, preferably 1–3 times the stoichiometric amount of sulphuric acid. Preferably this ratio is within the range 1.7–2.4. Expressed as a molar ratio, the stoichiometric molar ratio of sulphuric acid to aluminium oxide is 3, in which case the molar ratio of sulphuric acid to aluminium oxide used in the invention is at minimum 3, typically 3–9, and preferably it is 5.1–7.2. As stated above, the starting temperature is at minimum 70° C., typically 70–100° C., and preferably 80–90° C. The particle size of the aluminium oxide is primarily such that 80% of the particles are under 500 μm, preferably such that 80% are under 100 μm.

After the dissolving reaction, the solution which contains sulphuric acid and dissolved aluminium, and which also contains organic substance in a carbonized form and possibly also other insoluble matter, may be treated further in many different ways. One option is to dilute the acid solution from the dissolving step with water, and further to add to it aluminium hydrate, which dissolves in the sulphuric acid solution. The adding is continued until all of the acid is spent and the solution is neutralized. Thus, after this neutralization the solution phase is almost neutral, containing aluminium sulphate in a soluble form and the said insoluble substances. Finally the solids are separated from the solution by, for example, filtration. The obtained filtrate can be used, for example, as a water treatment chemical, or it can be used for the preparation of other aluminium products. In addition to, or alongside with, the said aluminium hydrate it is possible to use some other compound which neutralizes the acid. This compound may contain aluminium or iron. If the compound contains iron, a mixed coagulant of aluminium and iron is obtained.

Another option is to dilute with water the acid solution from the dissolving step and further to add to it bauxite ($Al_2O_3 \cdot nH_2O$), which is the most common raw material for aluminium chemicals and dissolves in a sulphuric acid solution. The adding is continued until all of the acid is spent. Thereafter the obtained suspension is granulated, whereupon a granular aluminium sulphate product is obtained which also contains carbon. The obtained product is suited, for example, for use as an Al chemical in the treatment of waste water. The carbon present as an impurity will not hamper the use, since the undissolved carbon will be removed with other solid impurities in the waste water treatment process. It is also possible to remove the solids, for example, by filtration before the granulation, in which case a granular aluminium sulphate product which does not contain carbon is obtained after the granulation. As was pointed out, in addition to, or alongside with, bauxite it is possible to use some other acid-neutralizing compound. This compound may contain aluminium and/or iron. If the compound contains iron, a mixed coagulant of aluminium and iron is obtained.

The precise mechanism of carbonization is not known. However, carbonization involves the decomposition of organic matter in an oxygen-free space, in which case most of the carbon is left free.

The invention is described below in greater detail, with reference to the accompanying figures, in which

DETAILED DESCRIPTION OF THE INVENTION

Figure 1:
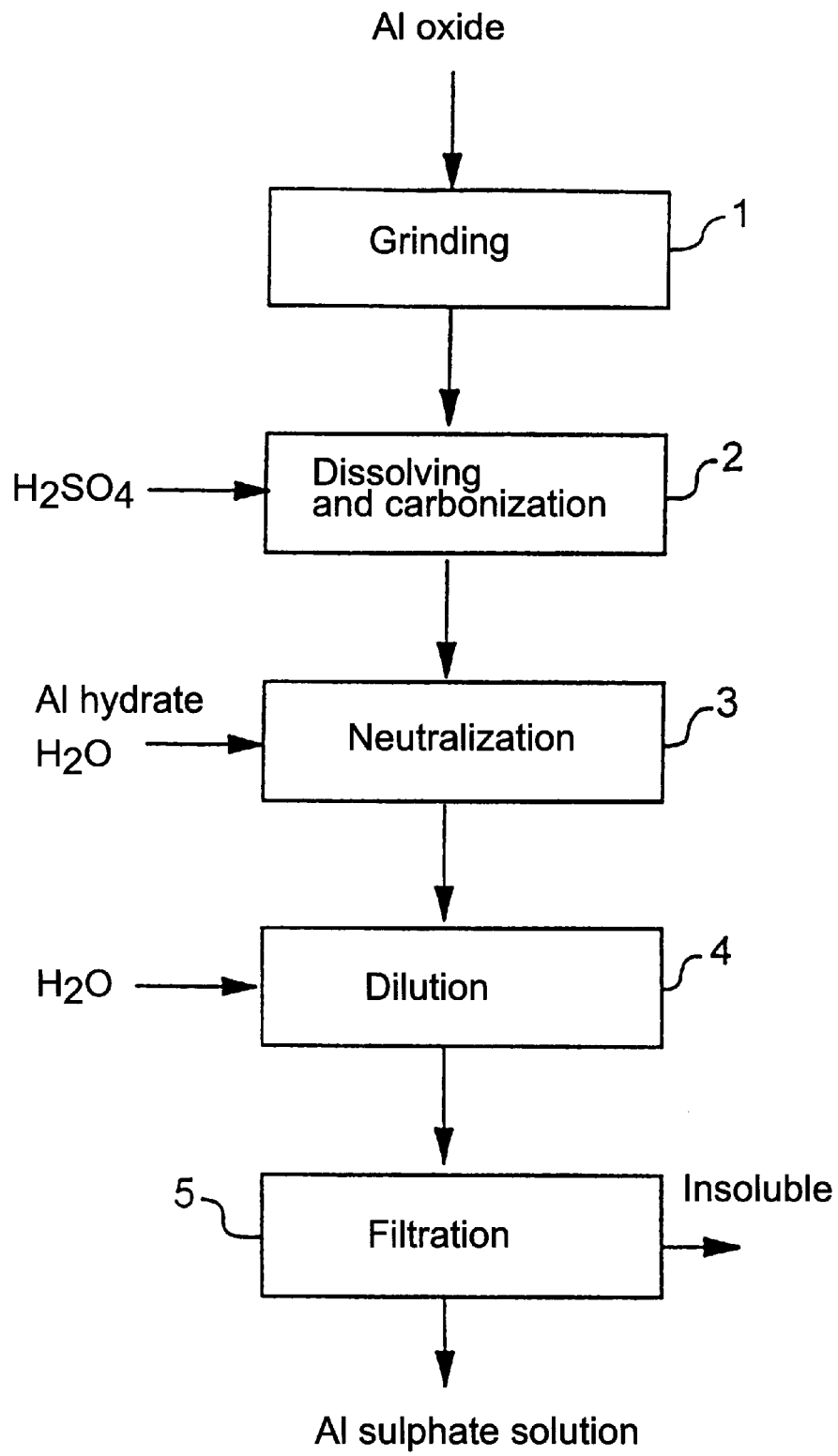
FIG. 1 shows diagrammatically one purification process using the method according to the invention, its product being an Al sulphate solution suited for the treatment of water.

In the process shown in FIG. 1, the first step is grinding 1, in which a coarse, impure aluminium oxide is ground. The grinding mill may be, for example, a cone crusher, which crushes the aluminium oxide to a suitable particle size. The crushed aluminium oxide is directed to a dissolving and carbonizing step 2 equipped with an agitator, i.e. into a reactor which contains concentrated sulphuric acid and which is heated to a suitable starting temperature. The heat of reaction generated after the reaction has started will heat the reactor further. Simultaneously with the reaction between the sulphuric acid and the aluminium oxide, the organic matter decomposes and becomes carbonized into an acid-insoluble form. In the subsequent step of the method, the neutralization step 3, water is added to the mixture of acid solution and insoluble matter to dilute the solution, and aluminium hydrate is added to spend the excess acid present in the solution. The solution obtained from the neutralization step 3 is further diluted with water in a dilution step 4. The dilution step 4 is followed by filtration 5, in which solid impurities are separated from the solution. The obtained filtrate contains aluminium sulphate in a soluble form, and it can as such be used as a precipitation chemical in the treatment of water. The filtrate can, of course, be used for preparing other aluminium products.

Figure 2:
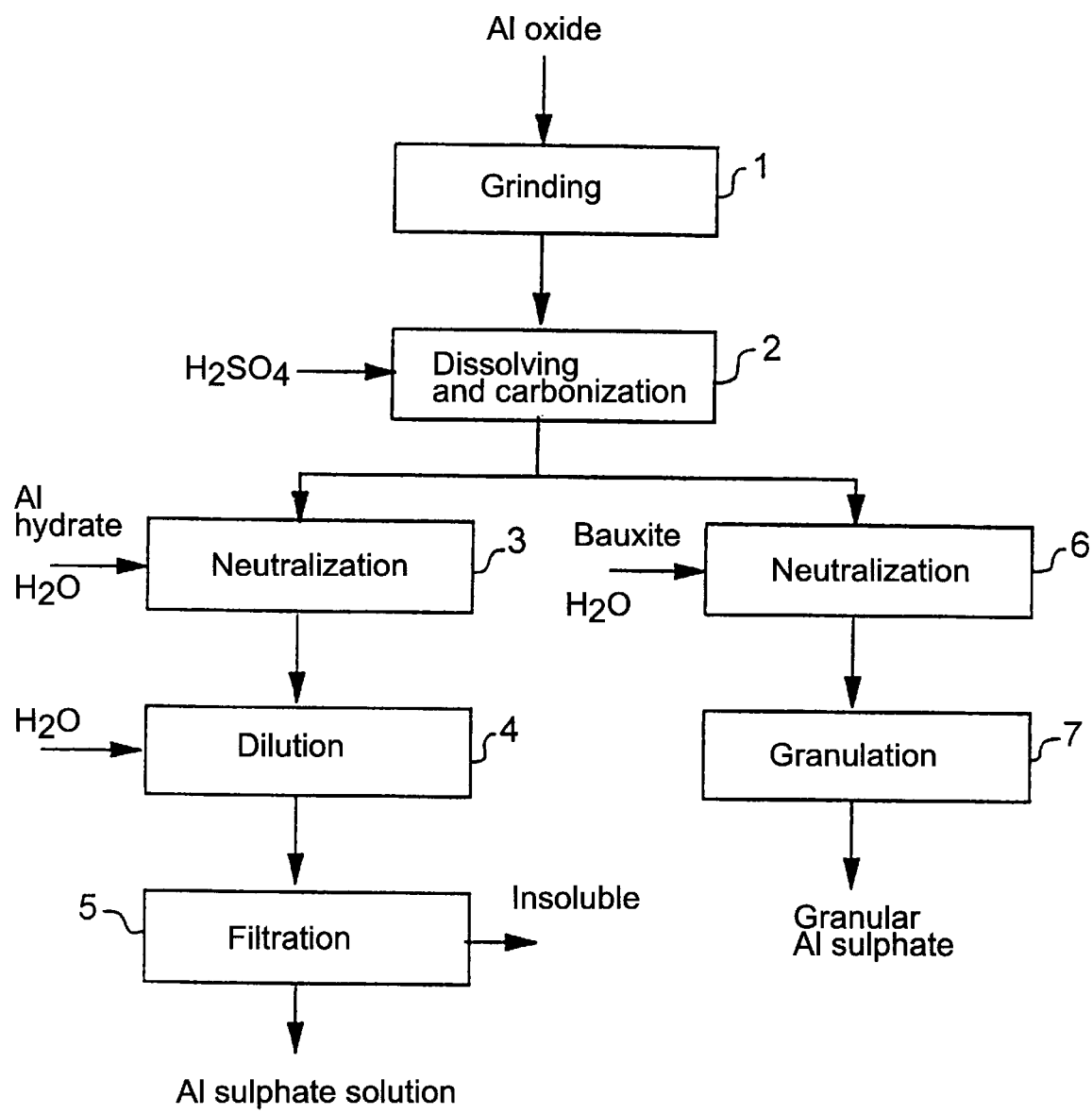
FIG. 2 shows another process based on the method according to the invention, the process containing as a part of it the process according to FIG. 1, and the product of the process being not only an aluminium sulphate solution but also a granular aluminium sulphate chemical.

FIG. 2 shows another embodiment of the method of the invention. The process shown in this figure is in other respects similar to the process of FIG. 1 except that part of the acid mixture of the dissolving and carbonization step 2 is directed to a second neutralization step 6, where bauxite and water are added to the mixture. Thereafter the mixture is granulated in a granulation step 7, whereby a solid product is obtained which contains aluminium sulphate and also other insoluble ingredients. The product is suitable for the treatment of waste water, in which the insoluble impurities present in the product will not be deleterious, since they will be removed with other solids in the waste water treatment process.

Below, the invention is elucidated further by means of examples.

A 1 $dm^3$ glass reactor equipped with an anchor agitator was used in the experiments. The reactor was heated using a heating jacket, and the heater was controlled using a high-grade temperature control. The reactor temperature was measured by thermoelement measuring. In the first step of the experiment, concentrated sulphuric acid was poured into the reactor and the agitator was started. When necessary, the acid was diluted to the desired concentration. Thereafter, approx. 56 g of Al oxide was added. The spent impure aluminium oxide typically had an organic impurity content of approx. 8%. The heater was programmed to heat the mixture to the desired starting temperature. When the starting temperature was reached, the reaction started, and under the effect of the heat of reaction the temperature rose to a certain peak temperature. At the end of the reaction the reaction mixture was cooled and diluted with water to an $Al_2O_3$ concentration of 4%. At this stage the temperature of the solution was approx. 100° C., and the solution was agitated further for approx. 60 min. Thereafter the diluted solution was filtered and the filtrate was analyzed for TOC (total organic carbon). The lower this concentration in the filtrate, the better the method had succeeded in the removal of organic matter.

Effect of the Starting Temperature:

The effect of the starting temperature was investigated in the following experiments. Ground impure aluminium oxide was used in the experiments. The starting temperature was varied between 70° C. and 90° C. The results are shown in Table 1. It is to be noted that in Experiment 2a the reaction did not start at all. The best result was achieved when the starting temperature was 80° C. or 90° C.

TABLE 1

| Exp. | Starting temperature ° C. | Acid: Al$_2$O$_3$ | Sulphuric acid concentration % | Degree of fineness of Al oxide | Peak temperature ° C. | TOC of filtrate % |
|---|---|---|---|---|---|---|
| 2a | 70 | 2.33 | 93 | Ground | — | — |
| 2b | 75 | 2.33 | 93 | Ground | 156 | 0.051 |
| 14 | 80 | 2.33 | 93 | Ground | 193 | 0.041 |
| 3 | 90 | 2.33 | 93 | Ground | 189 | 0.037 |

Effect of the Particle Size and the Organic Impurities:

The effect of the particle size was investigated in Experiments 6, 14 and 4, in all of which an impure aluminium oxide was used. The coarsest raw material used was coarse pellets. By the percentage values of the particle size distribution used below are meant percentages based on the mass of the sample. The particle size distribution of the pellets was such that 30% of the pellets were larger than 0.5 mm and more than 50% were larger than 0.1 mm. In the second and third experiments, a ground (cone crusher, Sala) impure aluminium oxide was used the size distribution of which was such that 5% were coarser than 0.5 mm and more than 50% were coarser than 0.1 mm. The finest raw material used was an impure aluminium oxide which had been obtained by screening a fraction which was smaller than 105 μm. The results are shown in Table 2. The results of Experiments 6, 14 and 4 show that the particle size has a great effect. The finer the raw material, the better the result. Likewise, the reaction is more drastic, which is shown in the peak temperature.

The effect of the organic impurities was investigated in Experiments 14 and 5. A completely pure ground aluminium oxide was used in Experiment 5. The results show that in Experiment 14 the peak temperature was higher than in Experiment 5. It was additionally observed in these experiments that in Experiment 6 the temperature rose from the starting temperature to the peak temperature in 7 minutes, whereas in Experiment 14 the corresponding temperature increase took place much more rapidly, in 3 minutes. Thus, the carbonization phenomenon has a considerable effect on the speed of the temperature increase and the starting of the reaction.

TABLE 2

| Exp. | Starting temperature ° C. | Acid: Al$_2$O$_3$ | Sulphuric acid concentration % | Degree of fineness of Al oxide | Peak temperature ° C. | TOC of filtrate % |
|---|---|---|---|---|---|---|
| 6 | 80 | 2.33 | 93 | Pellets | 130 | 0.051 |
| 5 | 80 | 2.00 | 93 | Ground [1] | 180 | 0.001 |
| 14 | 80 | 2.33 | 93 | Ground [2] | 193 | 0.041 |
| 4 | 80 | 2.33 | 93 | <105 μm [3] | 191 | 0.032 |

1) Ground pure aluminium oxide, no organic impurities
2) Ground by using a cone crusher (Sala)
3) Fraction separated by screening from ground impure aluminium oxide Effect of the Sulphuric Acid Concentration The effect of the sulphuric acid concentration was investigated in the following experiments, in which the concentration varied between 93 and 98% by weight. The results are shown in Table 3. The differences among the results are not very great, but the best result was obtained in the experiment in which the concentration of the acid used was 96% by weight.

TABLE 3

| Exp. | Starting temperature ° C. | Acid: Al$_2$O$_3$ | Sulphuric acid concentration % | Degree of fineness of Al oxide | Peak temperature ° C. | TOC of filtrate % |
|---|---|---|---|---|---|---|
| 11 | 80 | 2.33 | 98 | Ground | 205 | 0.043 |
| 10 | 80 | 2.33 | 96 | Ground | 204 | 0.040 |
| 14 | 80 | 2.33 | 93 | Ground | 193 | 0.041 |

Effect of the Acid/Al Oxide Ratio

The effect of the acid/Al oxide ratio was investigated in the following experiments. The ratio varied from 1.17 to 2.33. The results are shown in Table 4. It is to be noted that value 1 of the ratio corresponds to the stoichiometric ratio in reaction $$Al_2O_3 + 3H_2SO_4 \rightarrow Al_2(SO_4)_3 + 3H_2O$$

i.e. the value shown in the table multiplied by three will yield the molar ratio of sulphuric acid to aluminium oxide. The results show that the best result was obtained when the ratio was 2.33 times the stoichiometric ratio.

TABLE 4

| Exp. | Starting temperature ° C. | Acid: Al$_2$O$_3$ | Sulphuric acid concentration % | Degree of fineness of Al oxide | Peak temperature ° C. | TOC of filtrate % |
|---|---|---|---|---|---|---|
| 9 | 80 | 1.17 | 93 | Ground | 145 | 0.048 |
| 8 | 80 | 1.75 | 93 | Ground | 179 | 0.047 |
| 14 | 80 | 2.33 | 93 | Ground | 193 | 0.041 |

For an expert in the art it is clear that the invention is not limited to the embodiments or experiments described above; the invention can be modified within the limits defined in the following patent claims.

We claim:

1. A method for treating an impure aluminium oxide so that the organic impurities present therein are converted into an insoluble and separable substance, comprising grinding aluminium oxide which contains organic matter as impurities, dissolving the ground aluminium oxide at a starting temperature of above 70° C. in sulphuric acid having a concentration of at minimum 90% by weight, the amount of sulphuric acid being at least stoichiometric in relation to the amount of aluminium oxide, the organic matter being carbonized into an insoluble and separable substance and, optionally further treating the obtained mixture in order to produce a solution-form or solid chemical which contains aluminium.

2. A method according to claim 1, wherein the concentration of the sulphuric acid is 93–98% by weight.

3. A method according to claim 1 or 2, wherein the molar ratio of sulphuric acid to aluminium oxide is 3–9.

4. A method according to claim 1, wherein the starting temperature for the dissolving in sulphuric acid is ranging from above 70° C. to 100° C.

5. A method according to claim 1, wherein the impure aluminium oxide is ground so that 80% of the particles have a particle size smaller than 0.5 mm.

6. A method according to claim 1, wherein the further treatment comprises diluting said mixture with water, neutralizing and mixture, and thereafter separating the insoluble matter in order to obtain a solution-form chemical which contains aluminium sulphate.

7. A method according to claim 6, wherein said neutralizing uses an aluminium and/or iron compound.

8. A method according to claim 1 wherein the further treating comprises diluting with water and neutralizing the obtained mixture, optionally separating the insoluble matter, and then granulating in order to obtain a solid chemical which contains aluminium sulphate.

9. A method according to claim 8, wherein said neutralizinlg uses an aluminium and/or iron compound.

10. A method according to claim 1 wherein the impure aluminium oxide is obtained from a hydrogen peroxide process.

11. A method according to claim 1 further comprising treating the obtained mixture to produce said solution-form or solid chemical usable as a water treatment or retention chemical.

12. A method according to claim 3, wherein the molar ratio of sulphuric acid to aluminium oxide is 5.1–7.2.

13. A method according to claim 4, wherein the starting temperature for the dissolving in sulphuric acid is 80–90° C.

14. A method according to claim 5, wherein the impure aluminium oxide is ground so that 80% of the particles have a particle size smaller than 0.1 mm.

15. A method according to claim 7, wherein the aluminium and/or iron compound is aluminium hydrate.

16. A method according to claim 9, wherein the aluminium and/or iron compound is bauxite.

* * * * *